United States Patent
Spitsberg et al.

(10) Patent No.: US 6,296,909 B1
(45) Date of Patent: Oct. 2, 2001

(54) METHOD FOR THERMALLY SPRAYING CRACK-FREE MULLITE COATINGS ON CERAMIC-BASED SUBSTRATES

(75) Inventors: Irene T. Spitsberg, Loveland, OH (US); Hongyu Wang, Niskayuna, NY (US); Raymond W. Heidorn, Fairfield, OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/569,289

(22) Filed: May 11, 2000

Related U.S. Application Data

(62) Division of application No. 09/219,151, filed on Dec. 22, 1998, now Pat. No. 6,129,954.

(51) Int. Cl.[7] .................................................. C23C 4/10
(52) U.S. Cl. ........................ 427/452; 427/453; 427/454
(58) Field of Search ..................................... 427/452, 453, 427/454

(56) References Cited

U.S. PATENT DOCUMENTS

| | | | |
|---|---|---|---|
| 5,391,404 | 2/1995 | Lee et al. | 427/452 |
| 5,869,146 | 2/1999 | McCluskey et al. | 427/452 |

*Primary Examiner*—Katherine A. Bareford
(74) *Attorney, Agent, or Firm*—Andrew C. Hess; David L. Narciso

(57) ABSTRACT

A process for depositing a mullite coating on a silicon-based material, such as those used to form articles exposed to high temperatures and including the hostile thermal environment of a gas turbine engine. The process is generally to thermally spray a mullite powder to form a mullite layer on a substrate, in which the thermal spraying process is performed so that the mullite powder absorbs a sufficient low level of energy from the thermal source to prevent evaporation of silica from the mullite powder. Processing includes deposition parameter adjustments or annealing to maintain or reestablish phase equilibrium in the mullite layer, so that through-thickness cracks in the mullite layer are avoided.

9 Claims, No Drawings

METHOD FOR THERMALLY SPRAYING CRACK-FREE MULLITE COATINGS ON CERAMIC-BASED SUBSTRATES

This is a division of patent application Ser. No. 09/219,151, filed Dec. 22, 1998, now U.S. Pat. No. 6,129,954.

The invention herein described was made in the performance of work under a NASA contract and is subject to the provisions of Section 305 of the National Aeronautics and Space Act of 1958, Public Law 85-568 (72 Stat. 435; 42 USC §2457).

FIELD OF THE INVENTION

This invention relates to coating systems suitable for protecting components exposed to high-temperature environments, such as the hostile thermal environment of a gas turbine engine. More particularly, this invention is directed to methods for thermally spraying mullite coatings that have use as bond coats for thermal/environmental barrier coating systems on silicon-containing ceramic substrates.

BACKGROUND OF THE INVENTION

Higher operating temperatures for gas turbine engines are continuously sought in order to increase their efficiency. However, as operating temperatures increase, the high temperature durability of the components of the engine must correspondingly increase. While significant advances in high temperature capabilities have been achieved through formulation of iron, nickel and cobalt-base superalloys, alternative materials have been proposed. For example, materials containing silicon, such as those with silicon carbide (SiC) as a matrix material or a reinforcing material, are currently being considered for high temperature applications, such as combustor and other hot section components of gas turbine engines. In many applications, a protective coating over the Si-containing material is beneficial, an example of which is a thermal-insulating layer to reduce the operating temperature and thermal gradient through the material. Additionally, such coatings can provide environmental protection by inhibiting the major mechanism for degradation of silicon carbide in a corrosive environment, namely, the formation of volatile silicon monoxide (SiO) and silicon hydroxide ($Si(OH)_4$) products. On this basis, besides low thermal conductivity, a critical requirement of a coating system for a SiC-containing material is low activity of silica ($SiO_2$) in its composition. Other important properties for the coating material include a coefficient of thermal expansion (CTE) compatible with the SiC-containing material, low permeability for oxidants, and chemical compatibility with SiC and silica scale. Consequently, the coating essentially has a dual function, serving as a thermal barrier and simultaneously providing protection from the environment. For this reason, such a coating system will be referred to herein as a thermal/environmental barrier coating system, or TEBC.

While various coating systems have been investigated, each has exhibited shortcomings relating to the above-noted requirements and properties for compatibility with a Si-containing material. For example, an yttria-stabilized zirconia (YSZ) coating serving as a thermal barrier layer exhibits excellent environmental resistance by itself, since it does not contain silica in its composition. However, YSZ exhibits high permeability to oxygen and other oxidants. In addition, YSZ cannot be adhered directly to silicon carbide because of a coefficient of thermal expansion mismatch. As a result, mullite ($3Al_2O_3 \cdot 2SiO_2$) has been proposed as a bond coat between SiC-containing substrate materials and ceramic coatings such as YSZ in order to compensate for differences in coefficients of thermal expansion.

Processibility by plasma spraying and good adhesion to silicon-based ceramics and ceramic composites have been shown for mullite. However, thermally-sprayed mullite bond coats have exhibited a large number of through-thickness cracks which serve as fast paths for the transport of corrosive species to the underlying substrate, and coating failures caused by extensive interfacial oxidation have been observed. The presence of the through-thickness cracks in mullite coatings was unexpected, because stoichiometric mullite ($3Al_2O_3 \cdot 2SiO_2$) has a coefficient of thermal expansion fairly close to that of silicon-based ceramic composite materials. Accordingly, there is a need for the prevention of through-thickness cracks in mullite bond coats for TEBCs on silicon-based materials.

SUMMARY OF THE INVENTION

The present invention generally provides a process for depositing a mullite layer on a silicon-based material, such as those used to form articles exposed to high temperatures and including the hostile thermal environment of a gas turbine engine. Examples of silicon-based materials of interest to this invention include those with a dispersion of silicon carbide particles as a reinforcement material in a metallic or nonmetallic matrix, as well as those having a silicon carbide matrix, and particularly composite materials that employ silicon carbide as both the reinforcement and matrix materials (Si/SiC composites). The invention is particularly useful for thermally spraying crack-free mullite bond coats for thermal/environmental barrier coatings (TEBCs) on silicon-based substrates.

According to this invention, it was determined that the presence of transverse through-thickness cracks in mullite coatings is attributed to large in-plane tensile stresses being generated during cooling from the elevated deposition temperatures required to deposit such coatings. Microstructural examinations showed that more than one distinct phase occurs within mullite coatings deposited by thermally spraying a mullite powder, and that these phases contain varying amounts of silicon and aluminum. One of the phases was determined to be alumina ($Al_2O_3$), leading to the conclusion that mullite phase decomposition can take place during thermal spraying. The presence of alumina and phases with high alumina content in a mullite coating was concluded to sufficiently increase the coefficient of thermal expansion and elastic modulus of the coating to cause the aforementioned through-thickness cracks. It was also determined that alumina and alumina-rich phases can be generated in a mullite coating if silica is lost during deposition of the mullite powder by means such as volatilization during deposition. Therefore, this invention provides processing techniques that maintain or reestablish phase equilibrium in a mullite layer deposited by thermal spraying.

The general method of the invention is to thermally spray a mullite powder to form a mullite layer on a substrate, in which the thermal spraying process is performed so that the mullite powder attains a temperature above its peritectic temperature (about 1830° C.) during deposition. In one form of the invention, the thermal spray parameters are adjusted to heat the mullite powder to a temperature above its liquidus temperature during deposition. With this technique, the deposition parameters must be controlled to prevent evaporation of silica from the mullite powder. The resulting mullite layer is then cooled at a rate sufficient to quench the molten powder and thereby prevent formation of alumina and silica-rich phases in the layer. According to this invention, the avoidance of such phases, and particularly alumina phases, in the mullite layer prevents the formation of through-thickness cracks in the mullite layer.

Alternatively, the mullite powder is heated during deposition to a temperature of between 1830° C. and the liquidus temperature of mullite (about 1950° C., depending on the exact composition of the mullite powder), such that the resulting mullite layer contains alumina and silica-rich phases in a mullite matrix. Thereafter, the mullite layer is heated before it has cooled sufficiently to crack. Heating is performed for a duration and at a temperature sufficient to convert the alumina and silica-rich phases to mullite, and thereby substantially achieves phase equilibrium within the mullite layer. As a result, following cooling the mullite layer is substantially free of the alumina phases and through-thickness cracks.

Other objects and advantages of this invention will be better appreciated from the following detailed description.

DETAILED DESCRIPTION OF THE INVENTION

While the present invention is particularly directed to the deposition of a mullite coating as a bond coat for a ceramic coating on a substrate containing silicon, such as a SiC/SiC composite, the invention broadly encompasses the deposition of mullite on any surface by thermal spraying, and is not limited to applications where the mullite coating serves as a bond coat.

Deposition techniques employed to deposit mullite coatings in accordance with this invention are thermal spray techniques, which include air plasma spraying (APS) and low pressure plasma spraying (LPPS, also known as vacuum plasma spray, or VPS), though it is foreseeable that deposition could be performed by other known thermal spray techniques such as high velocity oxy-fuel (HVOF). APS is performed under atmospheric conditions, while LPPS is typically performed in an inert atmosphere (e.g., argon) at a pressure of less than 0.1 atm. With each of these techniques, a coating material in powder form is melted or partially melted by a plasma as it leaves a spray gun, resulting in "splats" of molten material being deposited onto a targeted surface. A ceramic coating can then be deposited on the resulting mullite coating by any suitable technique, including plasma spraying and physical vapor deposition (PVD).

In accordance with this invention, the formation of through-thickness cracks in mullite coatings has been determined to be related to the presence of non-equilibrium phases, and particularly laminar alumina phases, which cause the coating to have localized regions of much higher CTE than the remaining mullite matrix. Two mechanisms have been identified as the cause of alumina formation during thermal spraying, depending on the thermal conditions during spraying. During plasma spraying, mullite powders are subjected to the extremely high temperature (3000° C. or more) of the plasma flame, which can cause partial or complete melting of the powder particles, depending on the time spent in the flame and the heat transfer rate.

The first mechanism is the loss of silica ($SiO_2$) from the original mullite powder during deposition. According to this invention, loss of silica has been determined to occur when the mullite powder is not only completely melted in the plasma, but is overheated to a temperature sufficient to evaporate silica while the powder is traveling within the plasma from the spray gun to the targeted surface. Generally, temperatures of about 2000° C. and higher are believed to be excessive for depositing mullite using typical thermal spraying processes. Loss of silica in this manner results in the final deposition being non-stoichiometric and rich in alumina. The mechanism associated with overheating of mullite powder (i.e., silica volatilization) in a plasma flame is most likely to occur with LPPS processes when standard process parameters are used, such as standoff distances of about five to about twenty inches (12.7 to 50.8 cm), and using 20 standard cubic feet per hour (SCFH) (about 9.44 standard liters per minute, or SLPM) of hydrogen in the plasma gas.

In contrast, the second mechanism that leads to excess alumina phase is incongruent melting of the mullite powder during deposition, in which the powder is heated above the peritectic temperature of mullite (about 1830° C.) but below the liquidus temperature of mullite (about 1950° C.). The result is that alumina phases and a silica-rich liquid phase are deposited onto the targeted surface, and non-equilibrium conditions of the consolidation process lead to excess alumina phase in the final coating. Incomplete melting of mullite in the plasma flame is most likely to occur with APS processes when standard process parameters are used.

Both of the two possible mechanisms of concern are strongly affected by the energy transfer from the plasma flame to the mullite powder, and such energy transfer can be controlled by adjusting the parameters of the plasma spray process. As a first approximation, the energy (Q) supplied to a powder during plasma spraying is proportional to the temperature of the plasma flame (T), the length of the thermally active zone of the plasma beam in which the powder travels (L), and the heat transfer coefficient ($\alpha$) of the plasma beam, and is indirectly proportional to the plasma beam velocity (v) according to the following relation:

$$Q=\alpha TL/v$$

Thus, the energy transfer from plasma to powder during coating deposition can be controlled by adjusting the parameters of plasma spraying. These parameters include those that can change the temperature of the flame, e.g., the type and composition of plasma gases used, those that can alter the heat transfer coefficient, e.g., $H_2$ gas increases the thermal conductivity of the plasma thereby increasing heat transfer from the plasma to powder, and those that affect the length of travel in the thermally active zone of the plasma, i.e., the stand-off distance between the spray gun and the targeted surface. Finally, plasma velocity is affected by the gas flow rate and gun power input.

Therefore, this invention employs proper combinations of spray parameters to achieve a level of energy transfer to the mullite powder that will prevent non-equilibrium deposition conditions that lead to mullite phase decomposition, and that also minimize the loss of silica. The present invention also provides processing steps that can be carried out to compensate for improper energy transfer levels to the mullite powder. These process steps and modifications can be employed together or separately.

According to this invention, one of the mechanisms for alumina phase formation is the loss of silica to vaporization in the plasma flame. A preferred approach to offset this loss is to control the deposition parameters that determine the heat transfer rate within the plasma spray. Testing performed during the development of this invention showed that VPS mullite coatings are mainly composed of stoichiometric mullite and alumina phases, with the alumina phases being consistently located at the surface of each individual splat and having distinct columnar grain structures. At the same time, there were essentially no silica-rich phases found. These results indicated that silica was lost from the surface area of each mullite powder particle as the powder traveled through the plasma, and the alumina phases were formed locally at the locations depleted of silica. Loss of silica as a result of excessive energy transfer from the plasma spray to a mullite powder was confirmed with experiments that were carried out to intentionally increase the temperature of a mullite powder during deposition.

In order to decrease the energy transfer to a mullite powder during plasma spraying, the plasma flame temperature can be decreased by using a different type of plasma gas, which is typically argon, nitrogen, hydrogen, helium, or a combination thereof. Heat transfer to the mullite powder can also be decreased by decreasing the thermal conductivity of the plasma gas, such as by decreasing or eliminating hydrogen in the plasma gas. The stand-off distance can also be decreased to reduce the amount of heat transferred to the mullite powder. However, the total effect of all of the process modifications should not reduce the energy transfer to the mullite powder below the level required to completely melt the powder. Therefore, a process window exists for all parameters within which a crack-free mullite coating can be produced.

Alternatively, if the presence of excess alumina phases is the result of incongruent melting of the mullite powder during deposition, this invention provides for a post-spray annealing step to promote a phase equilibrium process through diffusion. Importantly, annealing must be performed on the as-deposited coating before the coating has been allowed to cool to a temperature that exceeds a critical temperature difference for coating cracking, as will be discussed below. The annealing temperature must also be sufficiently high in order to promote the desired phase equilibrium process. However, excessively high temperatures should be avoided in order to protect the underlying substrate.

Mullite (nominally $3Al_2O_3 \cdot 2SiO_2$) melts incongruently when heated above about 1830° C. (the peritectic temperature) but less than the liquidus temperature, generating the alumina phases and the silica-rich liquid phase noted above. The solidification process for fully molten mullite starts at about 1950° C. (the liquidus temperature) with the formation of alumina and the silica-rich liquid, followed by the peritectic reaction at 1830° C., when mullite is formed. The peritectic reaction between alumina and the silica-rich liquid for the formation of mullite is slow because the rate limiting step is diffusion of aluminum ions from alumina through the forming mullite to the siliceous liquid. During plasma spraying, mullite powders are subjected to the extremely high temperature (3000° C. or more) of the plasma flame, causing partial or complete melting of the powder particles, depending on the time spent in the flame and the heat transfer rate. The molten particles then deposit on the targeted surface, which is kept at a relatively low temperature (e.g., less than 1400° C.), where it rapidly cools and solidifies. The cooling rate of the molten splats is sufficiently high to cause alumina phases produced by mullite decomposition in the plasma flame to also be present in the coating. Cooling the alumina-containing mullite coating more than a critical temperature difference, $\Delta t_c$, below the deposition temperature causes cracking of the coating as a result of the development of thermally-induced tensile in-plane stresses within the coating.

Therefore, post-spray annealing of the as-deposited coating must be performed in situ before the temperature of the coating has fallen the critical temperature difference, which can be readily determined experimentally. Suitable annealing conditions are sustained temperatures of about 1000° C. to about 2000° C. for a duration of about 0.1 to 30 seconds, depending on the mass or thickness of the as-deposited coating. The heat for the annealing step can be provided by the plasma torch and/or other heat sources such as a separate torch, laser, infrared light, and electron beam, and provides additional time and thermal energy for the phase equilibrium process to take place within the coating. Notably, additional heating of a thermally sprayed coating is unconventional, as power to the plasma gun is normally turned off to allow the coating to immediately begin cooling to room temperature. An adjustment in gun power and/or gun stand-off distance may be necessary under some conditions to supply enough (but not excessive) thermal energy during the annealing step for phase equilibrium to occur. After all alumina and any metastable phases are converted to mullite, the coefficient of thermal expansion of the coating is at a value that is close to that of a silicon-based ceramic substrate, such that through-thickness cracking of the coating from additional cooling is prevented.

The post-spray annealing step of this invention can be utilized in an "interrupted" coating process, by which the coating is deposited as multiple individual layers. Because the individual layers can be relatively thin, only a fraction of the time and thermal energy that would be necessary to anneal the entire coating is required for each layer, and a complete conversion of non-equilibrium phases to mullite throughout the thickness of the coating is promoted. Increasing the temperature of the target surface can also be employed to promote a complete conversion to mullite.

During an investigation leading to this invention, mullite coatings on silicon-based ceramic and ceramic composite substrates were prepared by APS and LPPS using various spray parameters that included plasma gun power (voltage and current to the plasma gun), the type of plasma gas (e.g., Ar, $N_2$, Ar+$N_2$, or $N_2$+$H_2$), the relative concentrations of the plasma gas/gases, the gas flow rate, and the substrate-to-gun stand-off distance. These parameters were adjusted based on the heat flux equation noted previously to determine the process window for each parameter and for combinations of parameters. Tests demonstrated that alumina within a mullite coating could be eliminated by decreasing the amount of hydrogen in the plasma gas from 20 SCFH (about 9.44 SLPM) to 13–15 SCFH (about 6.14 to about 7.08 SLPM) using a stand-off distance of about 11 inches (about 28 centimeters). The result was a crack-free mullite coating. In contrast, higher hydrogen concentrations resulted in through-thickness cracks in mullite coatings, presumably because hydrogen promotes thermal conduction from the plasma gas to the powder. While hydrogen was a key parameter in eliminating alumina formation, it is believed that crack-free mullite can be produced by other combinations of spray parameters so long as they achieve the desirable energy transfer level from plasma to powder.

While the invention has been described in terms of a preferred embodiment, it is apparent that other forms could be adopted by one skilled in the art. Accordingly, the scope of the invention is to be limited only by the following claims.

What is claimed is:

1. A method comprising the steps of:
    thermal spraying a mullite powder to form a mullite layer on a substrate, the thermal spraying step being performed so that the mullite powder is heated to a deposition temperature between the peritectic and liquidus temperatures of mullite, by which the mullite powder melts to form a silica-rich liquid phase and solid alumina phases, and the mullite layer is deposited to contain alumina phases in a silica-rich mullite matrix;

following deposition of the mullite layer but before the mullite layer cools from the deposition temperature to a temperature at which cracks form in the mullite layer, heating the mullite layer in-situ for a duration and at a temperature sufficient to convert the alumina phases to mullite and thereby substantially achieve phase equilibrium within the mullite layer; and then cooling the mullite layer to room temperature, the mullite layer being substantially free of alumina phases and silica-rich phases and free of through-thickness cracks.

2. A method as recited in claim 1, wherein the thermal spraying step is a process chosen from the group consisting of air plasma spraying and low pressure plasma spraying.

3. A method as recited in claim 1, wherein the thermal spraying step is performed with a plasma gun, and the in-situ heating step is performed using a plasma flame generated by the plasma gun.

4. A method as recited in claim 1, wherein the in-situ heating step is performed using at least one heat source selected from the group consisting of lasers, infrared lights, and electron beams.

5. A method as recited in claim 1, further comprising the step of depositing a ceramic coating on the mullite layer.

6. A method as recited in claim 1, wherein the substrate is a silicon-based monolithic or composite ceramic.

7. A method as recited in claim 1, wherein the substrate is chosen from the group consisting of silicon carbide particles dispersed in a matrix material, composites having a silicon carbide matrix, and composites having silicon carbide reinforcement in a silicon carbide matrix.

8. A method as recited in claim 1, the method further comprising at least one additional thermal spraying step followed by at least one additional heating step prior to the cooling step so that multiple mullite layers are deposited on the substrate, each of the mullite layers being substantially free of alumina phases and silica-rich phases following the heating steps.

9. A method as recited in claim 1, wherein the substrate is a component of a gas turbine engine.

* * * * *